United States Patent
Cheng

(10) Patent No.: US 7,376,331 B2
(45) Date of Patent: May 20, 2008

(54) METHOD AND SYSTEM FOR REGULATING POWER IN PORTABLE AUDIO/VIDEO PLAYBACK DEVICE

(75) Inventor: Yiou-Wen Cheng, Shu Lin (TW)

(73) Assignee: Cyberlink Corp., Shindian, Taipei (TW)

( * ) Notice: Subject to any disclaimer, the term of this patent is extended or adjusted under 35 U.S.C. 154(b) by 845 days.

(21) Appl. No.: 10/812,256

(22) Filed: Mar. 29, 2004

(65) Prior Publication Data

US 2005/0213929 A1    Sep. 29, 2005

(51) Int. Cl.
*H04N 5/91* (2006.01)
(52) U.S. Cl. .......................... 386/46; 386/96
(58) Field of Classification Search .............. 386/46, 386/93, 125, 126, 120; 369/47.33
See application file for complete search history.

(56) References Cited

U.S. PATENT DOCUMENTS 6,052,510 A * 4/2000 Sakaegi et al. ............. 386/120
6,928,039 B2 * 8/2005 Millikan et al. .......... 369/47.33

* cited by examiner

*Primary Examiner*—Huy Nguyen
(74) *Attorney, Agent, or Firm*—Thomas, Kayden, Horstemeyer & Risley

(57) ABSTRACT

A method and a system for regulating power in a portable audio/video playback device enabling the portable audio/video playback device to completely play an audio/video multimedia file or data without sufficient power or external power. A processing unit is employed for detecting a remaining power of the portable audio/video playback device and for computing an average power consumption rate and a remaining playback time of the audio/video multimedia file or data to thereby appropriately reduce an output level of the video or audio output signals. Accordingly, power consumption of the portable audio/video playback device is minimized so that a complete playback of the audio/video multimedia file or data can be performed by the portable audio/video playback device before the power is exhausted.

20 Claims, 3 Drawing Sheets

METHOD AND SYSTEM FOR REGULATING POWER IN PORTABLE AUDIO/VIDEO PLAYBACK DEVICE

BACKGROUND OF THE INVENTION

1. Field of the Invention

The present invention relates to a method and a system for regulating power in a portable audio/video playback device, and particularly, to a method and a system for a complete playback of an audio/video multimedia file or data by power regulation provided that the power supplied to a portable audio/video playback device is insufficient.

2. Description of the Related Art

As technology changes rapidly, audio and video devices are now in widespread use and multimedia players have become indispensable to everyday life in modem society. For example, household television sets, VCD/DVD players and various stereo systems are all designed to provide the users with better audio and video pleasures. Thanks to technology development, audio and video devices have been gradually miniaturized, and thus a portable audio/video player has been proposed, which makes it possible for the users to watch and listen to a multimedia file or data in the outdoors. However, such a portable audio/video player is usually subject to the limitation of power supply and therefore is very inconvenient in use.

In a portable audio/video player, such as an MP3 player or a notebook computer, in the current market, a battery is installed therein to provide the power required for the playback of the multimedia file or data. However, without an external charger, the battery usually lasts only about two hours. For example, an independent power supplied only by a battery of a notebook computer usually runs out before the completion of the playback of a film recorded in DVD format. Such a playback interruption depresses the user and creates an uncomfortable experience.

In the prior art, attempts for improving the structure of a battery to thus enhance the power duration thereof have been proposed. Alternatively, an external power saving device appended to the portable audio/video player has also been proposed to minimize the power consumption thereof. However, such methods or devices still fail to provide a solution for a user to watch a film or listen to a song completely. That is, the playback of the multimedia file will be interrupted when the power runs out, which impresses the user with an uncomfortable experience.

As can be seen from the description, the independent power of a conventional portable audio/video players is easily exhausted, which causes a playback interruption of a film or a song. The failure to provide a user with a complete audio or video pleasure makes it inconvenient in use. In the light of the above, the inventor has employed technical ideas and developed an innovative invention with reasonable design to improve the drawbacks.

SUMMARY OF THE INVENTION

The object of the present invention is to provide a method and a system for regulating power in a portable audio/video playback device, which enables the portable audio/video playback device to completely play an audio/video multimedia file or data before the power is exhausted. The method mainly comprises: detecting a present remaining power a in the power unit; reading an audio/video multimedia file or data and computing a playback time $\beta$ of the file or data; computing an average power consumption rate $\gamma$ of the portable audio/video playback device; and computing whether the present remaining power $\alpha$ is sufficient for a complete playback of the audio/video multimedia file or data, and, if the present remaining power $\alpha$ is not sufficient for a complete playback of the audio/video multimedia file or data, then reducing an output level of a video or audio output signal so that the complete playback of the audio/video multimedia file or data may be accomplished prior to exhaustion of the power.

BRIEF DESCRIPTION OF THE DRAWINGS

Features and advantages of the present invention will be fully understood from the detailed description to follow taken in conjunction with the embodiments as illustrated in the accompanying drawings, which are to be considered in all respects as illustrative and not restrictive, wherein.

DETAILED DESCRIPTION OF PREFERRED EMBODIMENTS

Figure 1:
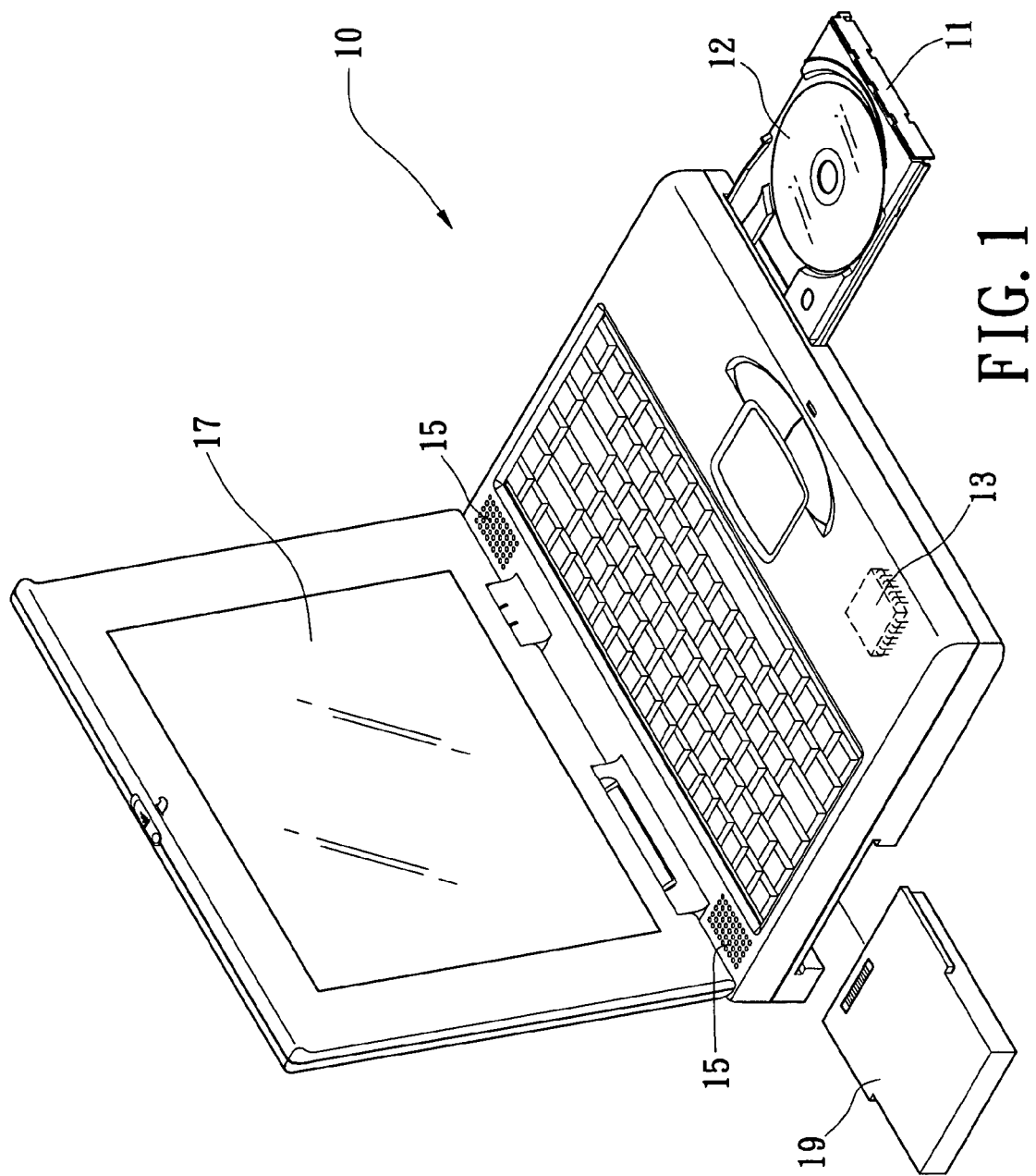
FIG. 1 schematically shows the structure of a portable audio/video playback device.

The present invention relates to a method and a system for regulating power in a portable audio/video playback device to accomplish a complete playback of an audio/video multimedia file or data before the power is exhausted. To begin with, please refer to FIG. 1, which schematically shows the structure of a portable audio/video playback device 10. In this embodiment, a portable computer is disclosed for illustrative purpose only and is not intended limit the scope of the invention. In practice, the invention may be applied to an MP3 player or any of a variety of portable multimedia players.

In the portable audio/video playback device 10, a power unit 19 is provided for supplying electric power to the portable audio/video playback device 10. As an optical disk 12 containing an audio/video multimedia file or data is inserted into an audio/video playback unit 11 by a user, the audio/video playback unit 11 is controlled by a processing unit 13 provided in the portable audio/video playback device 10 to read the audio/video multimedia file or data. A video signal (image signal) and an audio signal (sound signal) may be obtained from the audio/video multimedia file or data through a decoding process conducted by the processing unit 13. The video signal and the audio signal are then passed to a video unit 17 and an audio unit 15, respectively, for further processing to form video and audio playback output signals. In this embodiment, the audio/video playback unit 101 may be a VCD/DVD player, and the power unit 19 may be a battery.

Figure 2:
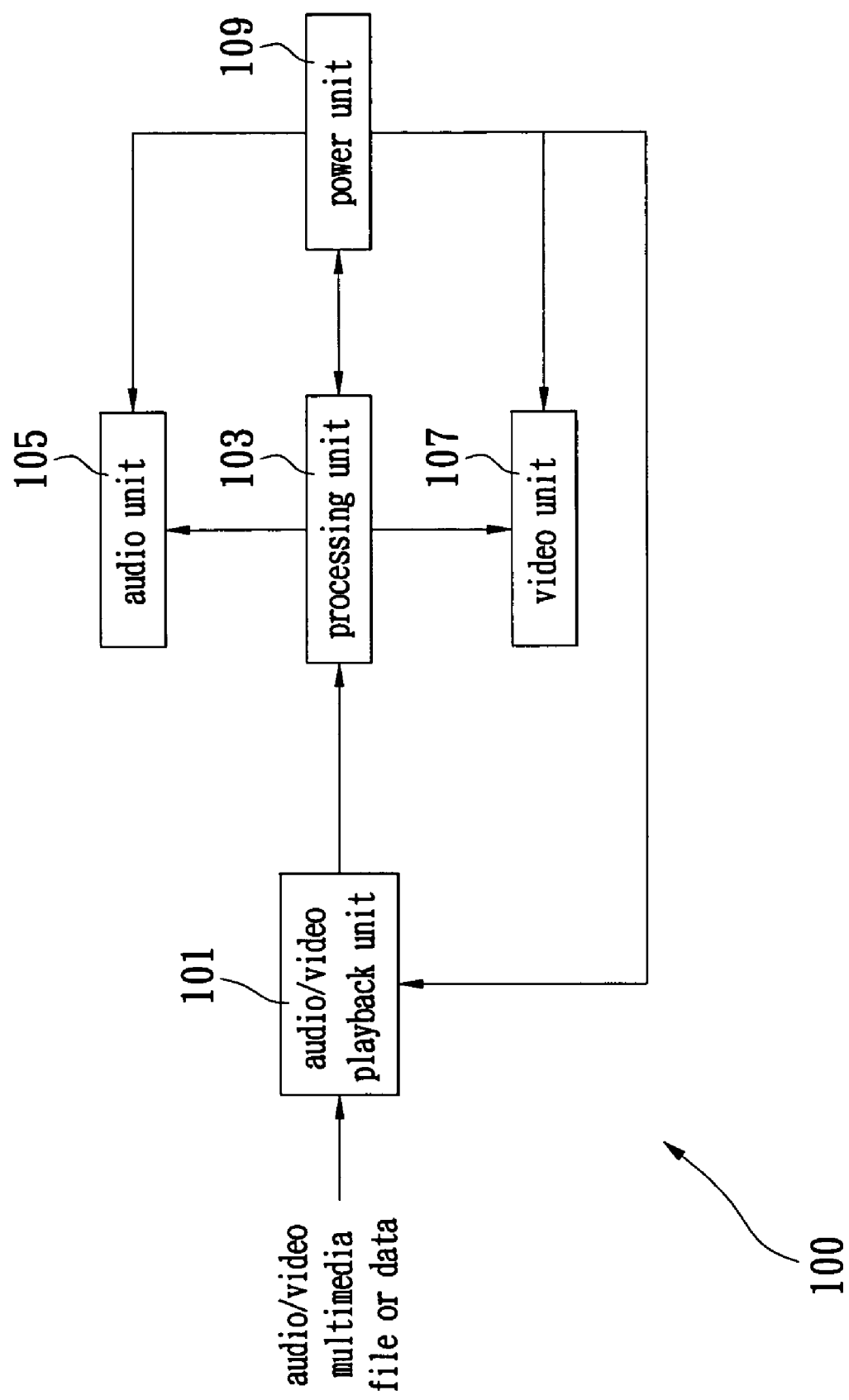
FIG. 2 is a block diagram of a portable audio/video playback device according to the present invention.

Referring to FIG. 2, a block diagram of the portable audio/video playback device 100 according to the present invention is shown. The power unit 109 is connected to the audio/video playback unit 101, the processing unit 103, the audio unit 105 and the video unit 107 to supply these units with the electric power required for operation. The processing unit 103 detects a present remaining power α in the power unit 109 at a predetermined time interval to determine whether the power state of the power unit 109 is sufficient or insufficient. The time interval may be set to 3 minutes or 5 minutes for example.

A processing unit 103 is provided in the portable audio/video playback device 100 and is connected with the audio/video playback unit 101, the audio unit 105, the video unit 107 and the power unit 109. Through the connection between the processing unit 103 and the audio/video playback unit 101, a playback time $\beta$ (or remaining time) for the audio/video multimedia file or data can be instantaneously determined. Meanwhile, the processing unit 103 also computes an average power consumption rate $\gamma$ of the portable audio/video playback device 100 to thereby determine whether or not the present remaining power $\alpha$ is sufficient to complete the playback of the audio/video multimedia file or data.

If a computation by the processing unit 103 shows that the remaining power $\alpha$ divided by the average power consumption rate $\gamma$ is small than the playback time $\beta$, then an instruction signal is issued to the audio unit 105 and the video unit 107 to reduce the output level of the video and audio output signals produced by these two units (the audio unit 105 and the video unit 107). First, one of the pins of the audio unit 105 is connected to the processing unit 103 to receive the instruction signal, and thus the audio output signal of the audio unit 105 may be reduced. For example, the power consumption rate of the portable audio/video playback device 100 may be reduced by reducing the output volume or special audio effect of the audio unit 105. Similarly, by connecting one of the pins of the video unit 107 to the processing unit 103, the brightness, contrast, resolution or special playback effect of the video output signal produced by the video unit 107 may be controlled at a lower level to thereby extend the power supply duration of the power unit 109.

Moreover, the processing unit 103 may lower the decoding completeness of the audio/video multimedia file or data to reduce the power consumption rate of the portable audio/video playback device 100. This is because reducing the decoding completeness can reduce the CPU usage so as to lower the CPU working voltage for saving power. In accordance with the commonly used technology, an audio sampling rate is 44.1 KHz or higher, and a video compression ratio is compressed or decoded based on MPEG4 format By lowering the audio sampling rate and the video compression ratio, the audio/video decoding completeness may be reduced, and thus the power supply duration of the power unit 109 is increased so that the remaining operable time of the power unit 109 becomes greater than the playback time $\beta$.

After the output level of the video and audio output signals is automatically reduced in the system, the processing unit 103 continues to compute at a predetermined time interval whether the present power is sufficient to complete the playback of the audio/video multimedia file or data. Since the output level changes, the playback time $\beta$ and the average power consumption rate $\gamma$ also change by an increment of the playback time $\Delta\beta$ and an increment of the average power consumption rate $\Delta\gamma$, respectively. At this time, the processing unit 103 computes whether $\alpha/(\gamma-\Delta\gamma)$ is greater than or equal to $(\beta-\Delta\beta)$. If $\alpha/(\gamma-\Delta\gamma) \geq (\beta-\Delta\beta)$, then the system stops lowering the output level of the video and audio signals.

On the other hand, if $\alpha/(\gamma-\Delta\gamma) < (\beta-\Delta\beta)$, then other output values are further adjusted to minimize the power consumption rate, for example, by lowering the frequency of the processing unit 103 or by switching off special playback effect that may consumes more power, so as to satisfy the condition $\alpha/(\gamma-\Delta\gamma) \geq (\beta-\Delta\gamma\beta)$. At last, if it still fails to reach a state that satisfies the above condition, then the playback speed of the audio/video playback unit 101 may be increased to shorten the required playback time for the audio/video multimedia file or data so that a complete playback of the audio/video multimedia file or data can be accomplished by the portable audio/video playback device 100 before the power is exhausted. However, the above output signals are not allowed to be reduced to a level lower than a predetermined limit value, because bad qualities of video and audio signals will not be acceptable by the users.

In the above preferred embodiment, in order to reduce the power consumption rate, several means have been proposed. These means include lowering brightness so as to reduce the power consumption of an LCD monitor, lowering volume so as to reduce the power consumption of a speaker, accelerating playback speed so as to shorten the playback time and thus reduce the total power consumption, lowering CPU speed by lowering CPU working voltage so as to reduce the power consumption of the processor, lowering decoding quality, and turning off the audio/visual effect that consumes extra power. Among the above, lowering decoding quality is to lower decoding completeness and to output unfully decoded data to the audience. Although the output quality thus obtained is worse than the fully decoded one, it requires less CPU usage and hence the power supplied to the CPU can be further reduced as described above.

It should be noted that lowering CPU usage itself does not result in power saving, but lowering the CPU working voltage does. For the same reason, power saving is not accomplished by merely turning off extra audio/visual effect, and the CPU working voltage must be further lowered to achieve the purpose. Furthermore, the power consumption cannot be reduced by simply lowering audio sampling rate or visual resolution while the speaker or the LCD is still outputting signals, and, to save power, the volume of the speaker or the brightness of the display must be lowered.

Figure 3:
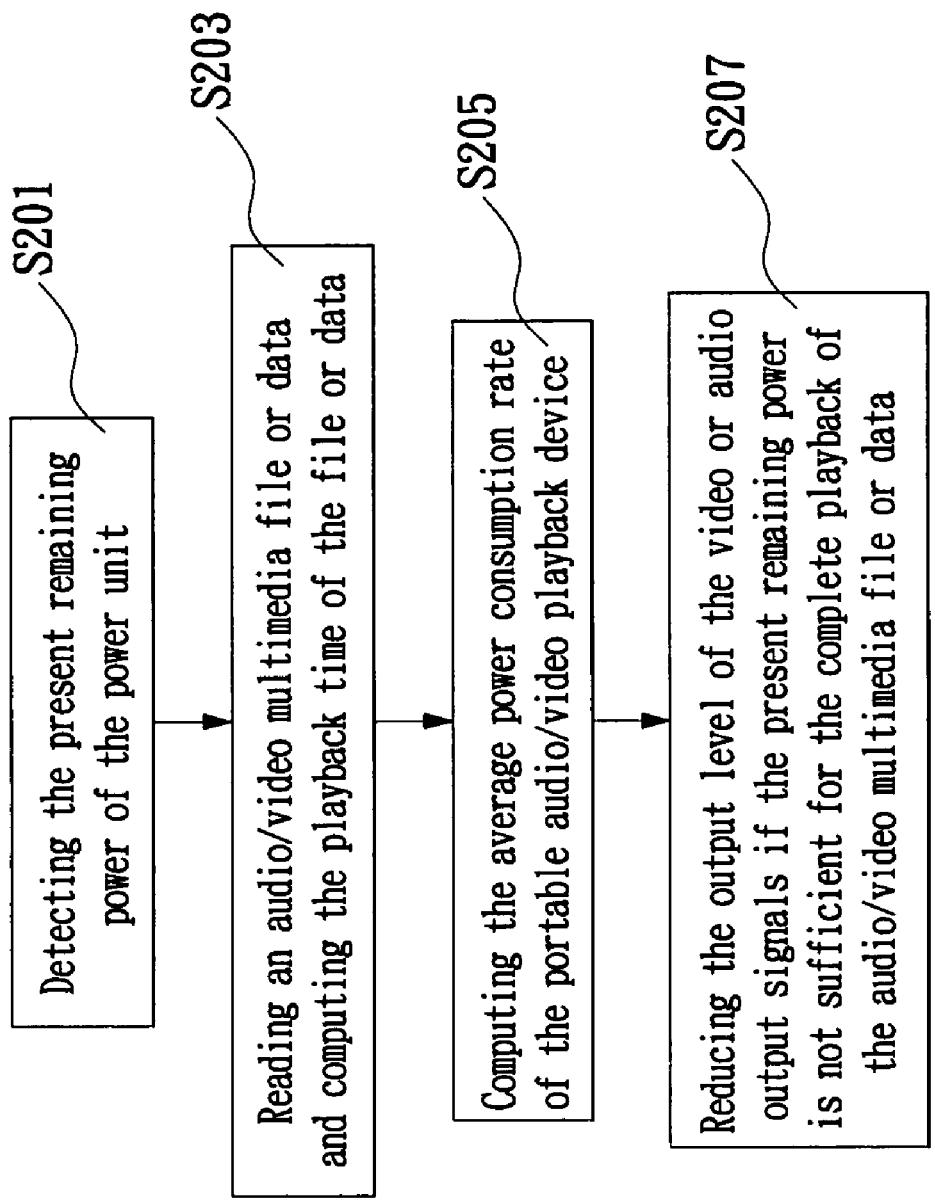
FIG. 3 is a flow chart for explaining the operation of the present invention.

Referring to FIG. 3, a flow chart for explaining the operation of the present invention is shown. First, the remaining power a of the power unit 109 is detected by the processing unit 103 (S201). Next, an audio/video multimedia file or data is read into the system and the processing unit 103 computes the playback time $\beta$ of the file or data (S203). Meanwhile, the processing unit 103 computes the average power consumption rate $\gamma$ of the portable audio/video playback device 10 (S205). Finally, if it is determined that the present remaining power $\alpha$ is not sufficient for the complete playback of the audio/video multimedia file or data, then the output level of the video or audio output signals (S207) may be lowered to thereby reduce the power consumption rate of the portable audio/video playback device 100 so that a complete playback of the audio/video multimedia file or data can be performed by the portable audio/video playback device 100.

In summary, with the method and the system for regulating power in the portable audio/video playback device 100, unnecessary power consumption may be effectively reduced so that the complete playback audio/video multimedia file or data can be accomplished by the portable audio/video playback device 100 before the power is exhausted. Accordingly, playback interruption of the audio/video multimedia file or data due to power exhaustion may be avoided and therefore protects the user from feeling uncomfortable.

While the present invention has been described with reference to the detailed description and the drawings of the preferred embodiments thereof, it is to be understood that the invention should not be considered as limited thereby. Various modifications and changes could be conceived of by those skilled in the art without departing from the scope of the present invention, which is indicated by the appended claims.

What is claimed is:

1. A method for regulating power in a portable audio/video playback device electrically supplied by a power unit, said method comprising the steps of:

detecting a present remaining power α in said power unit;

reading an audio/video multimedia file or data and computing a playback time β of said file or data;

computing an average power consumption rate γ of said portable audio/video playback device; and computing whether the present remaining power α is sufficient for a complete playback of said audio/video multimedia file or data, and, if the present remaining power α is not sufficient for a complete playback of said audio/video multimedia file or data, reducing an output level of a video or audio output signal so that the complete playback of said audio/video multimedia file or data is accomplished prior to exhaustion of the power supplied by said power unit.

2. The method for regulating power in a portable audio/video playback device of claim 1, wherein the step of reducing an output level of a video or audio output signal is achieved by performing at least one of the following steps:

reducing brightness of the video output signal;
reducing contrast of the video output signal;
reducing resolution of the video output signal;
reducing volume of the audio output signal;
reducing audio effect of the audio output signal;
reducing a decoding completeness of the video output signal; and
reducing a decoding completeness of the audio output signal.

3. The method for regulating power in a portable audio/video playback device of claim 2, wherein the step of reducing decoding completeness of the video or audio signals includes output unfully decoded audio/video signal.

4. The method for regulating power in a portable audio/video playback device of claim 1, wherein, in the step of reducing an output level of a video or audio output signal, the reduced output level is not lower than a limit value.

5. The method for regulating power in a portable audio/video playback device of claim 1, wherein the step of reducing an output level of a video or audio output signal comprises turning off a special playback effect of said portable audio/video playback device.

6. The method for regulating power in a portable audio/video playback device of claim 1, wherein the step of reducing an output level of a video or audio output signal comprises increasing a playback speed of said portable audio/video playback device.

7. The method for regulating power in a portable audio/video playback device of claim 1, wherein the step of reducing an output level of a video or audio output signal can be performed only under the condition that satisfies $\alpha/\gamma<\beta$.

8. The method for regulating power in a portable audio/video playback device of claim 1, wherein the step of computing whether the present remaining power α is sufficient for a complete playback of said audio/video multimedia file or data is performed by computing at a predetermined time interval.

9. The method for regulating power in a portable audio/video playback device of claim 8, wherein the predetermined time interval is 3 or 5 minutes.

10. The method for regulating power in a portable audio/video playback device of claim 8, wherein computing at a predetermined time interval is performed by using an increment of the playback time Δβ and an increment of the average power consumption rate Δγ.

11. The method for regulating power in a portable audio/video playback device of claim 1, wherein the step of reducing an output level of a video or audio output signal continues until the condition $\alpha/(\gamma-\Delta\gamma) \geqq (\beta-\Delta\beta)$ is satisfied.

12. A system for regulating power in a portable audio/video playback device electrically supplied by a power unit, said system comprising:

an audio/video playback unit for reading an audio/video multimedia file or data;

a video unit for producing a video output signal;

an audio unit for producing an audio output signal; and a processing unit connected to said power unit, said video unit, said audio unit and said audio/video playback unit, for detecting a remaining power in said power unit and computing a playback time of said audio/video multimedia file or data and an average power consumption rate of said power unit, whereby, in a situation of insufficient power supplied by said power unit, said system operates to reduce output levels of the video and audio output signals respectively produced by said video and audio units.

13. The system for regulating power in a portable audio/video playback device of claim 12, wherein one pin of said video unit is connected to said processing unit to receive therefrom an instruction signal for reducing the output level of the video output signal.

14. The system for regulating power in a portable audio/video playback device of claim 12, wherein one pin of said audio unit is connected to said processing unit to receive therefrom an instruction signal for reducing the output level of the audio output signal.

15. The system for regulating power in a portable audio/video playback device of claim 12, wherein said processing unit instantaneously detecting the remaining power in said power unit and computing the average power consumption rate of said power unit and the playback time of said audio/video multimedia file or data.

16. The system for regulating power in a portable audio/video playback device of claim 12, wherein said power unit is a battery.

17. The system for regulating power in a portable audio/video playback device of claim 12, wherein said video output signal includes brightness, contrast or resolution.

18. The system for regulating power in a portable audio/video playback device of claim 12, wherein said audio output signal includes volume and audio effect.

19. The system for regulating power in a portable audio/video playback device of claim 12, wherein a playback speed of said audio/video playback unit may be increased to reduce the playback time of said audio/video multimedia file or data.

20. The system for regulating power in a portable audio/video playback device of claim 12, wherein the output levels of the video and audio output signals are reduced by performing at least one of the following steps:

reducing brightness of the video output signal;
reducing contrast of the video output signal;
reducing resolution of the video output signal;
reducing volume of the audio output signal;
reducing audio effect of the audio output signal;
reducing a decoding completeness of the video output signal; and
reducing a decoding completeness of the audio output signal.

* * * * *